United States Patent [19]

Omo et al.

[11] Patent Number: 4,788,563
[45] Date of Patent: Nov. 29, 1988

[54] RECORDING APPARATUS

[75] Inventors: Shinichi Omo; Hideaki Okamoto, both of Yokohama, Japan

[73] Assignee: Canon Kabushiki Kaisha, Tokyo, Japan

[21] Appl. No.: 49,159

[22] Filed: May 13, 1987

[30] Foreign Application Priority Data

May 19, 1986 [JP] Japan .................................. 61-114026
May 19, 1986 [JP] Japan .................................. 61-114027

[51] Int. Cl.4 ............................................. G01D 15/16
[52] U.S. Cl. .................................. 346/140 R; 346/136
[58] Field of Search .................. 346/140, 136; 358/75, 358/78, 80

[56] References Cited

U.S. PATENT DOCUMENTS

| | | | |
|---|---|---|---|
| 3,898,670 | 8/1975 | Erikson et al. | 346/21 |
| 4,205,350 | 5/1980 | Gunning . | |
| 4,229,095 | 10/1980 | Mir . | |
| 4,528,576 | 7/1985 | Koumura et al. | 346/140 |
| 4,533,928 | 8/1985 | Sugiura et al. | 346/140 |
| 4,540,996 | 9/1985 | Saito | 346/140 |
| 4,550,053 | 10/1985 | Arai et al . | |
| 4,555,437 | 11/1985 | Tanck . | |
| 4,592,951 | 6/1986 | Viola . | |
| 4,617,580 | 10/1986 | Miyakawa | 346/140 X |
| 4,666,757 | 5/1987 | Helinski . | |
| 4,675,696 | 6/1987 | Suzuki | 346/140 X |
| 4,686,538 | 8/1987 | Kouzato | 346/140 X |

FOREIGN PATENT DOCUMENTS 58-136480  8/1983  Japan .

Primary Examiner—Joseph W. Hartary
Attorney, Agent, or Firm—Fitzpatrick, Cella, Harper & Scinto

[57] ABSTRACT

A recording apparatus includes memories for storing full-color image information to be recorded, a recording head for recording an image on a recording medium, and a control unit including a CPU, a counter, a delay circuit, and a head driver. The control unit has a normal paper recording mode for driving the recording head so that an erected image is recorded on the normal recording sheet and a B.P.F. (Back-Print Film) recording mode for driving the recording head so that the same erected image is recorded on the B.P.F. sheet when the image is veined from the back side of the sheet.

17 Claims, 10 Drawing Sheets

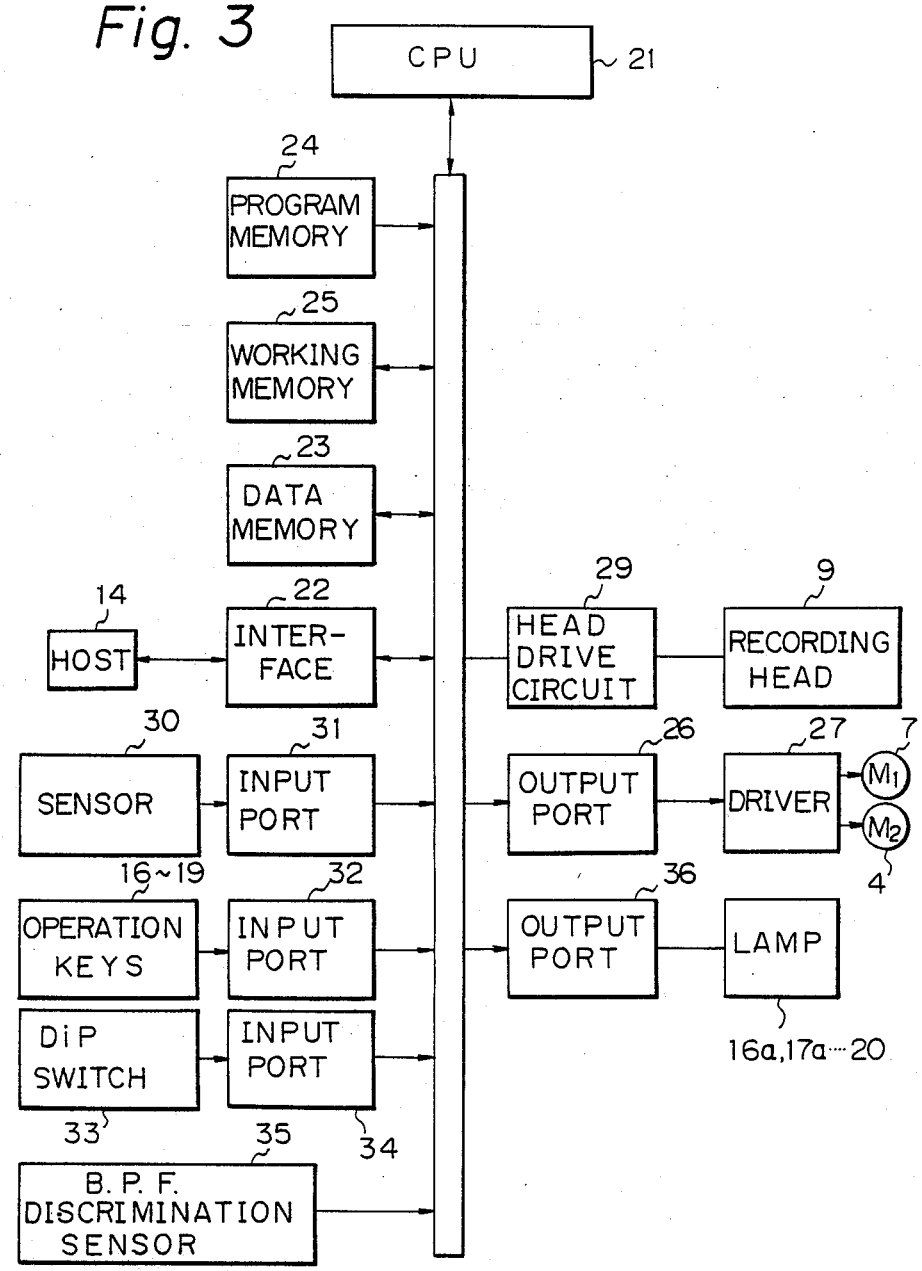

Fig. 6
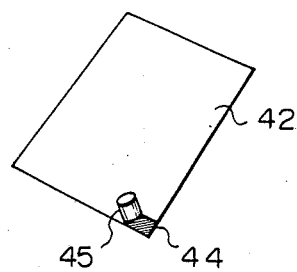
Fig. 7A    Fig. 7B
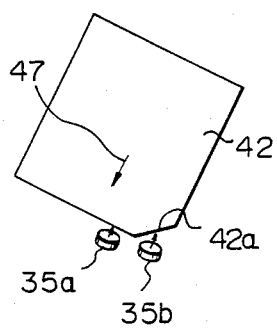 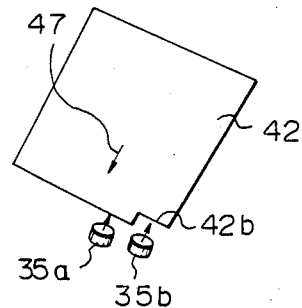

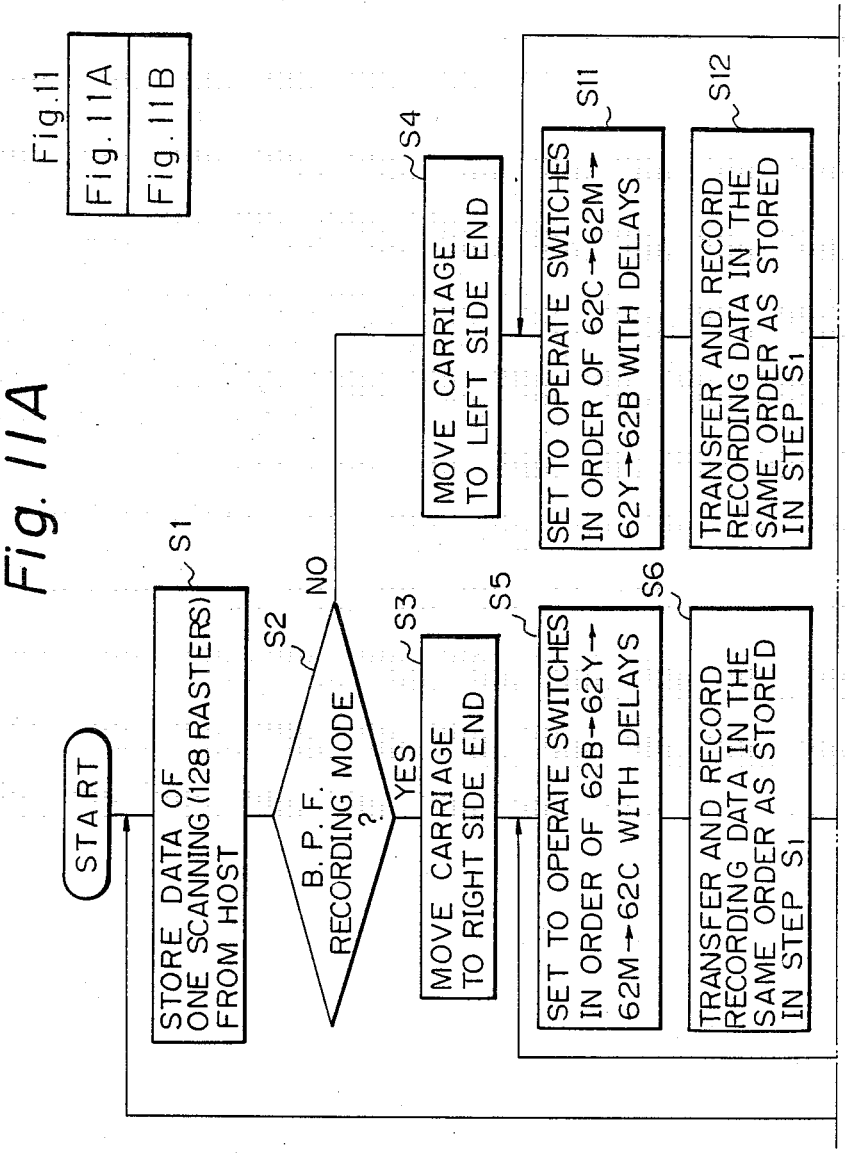

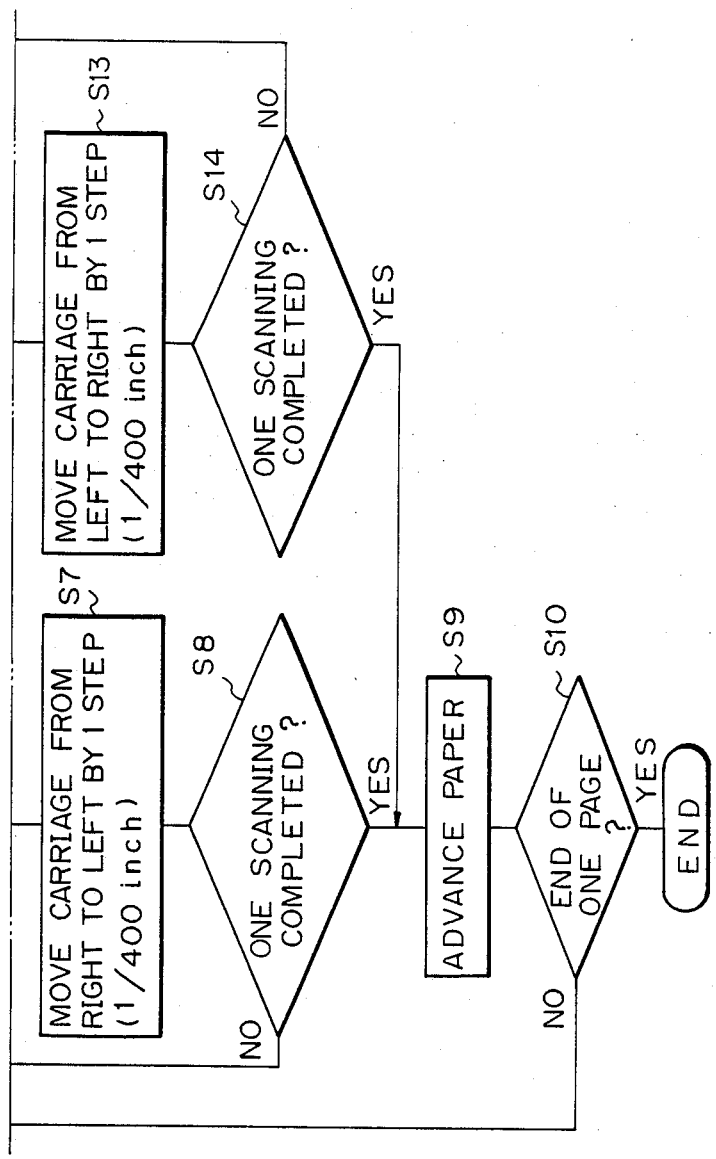

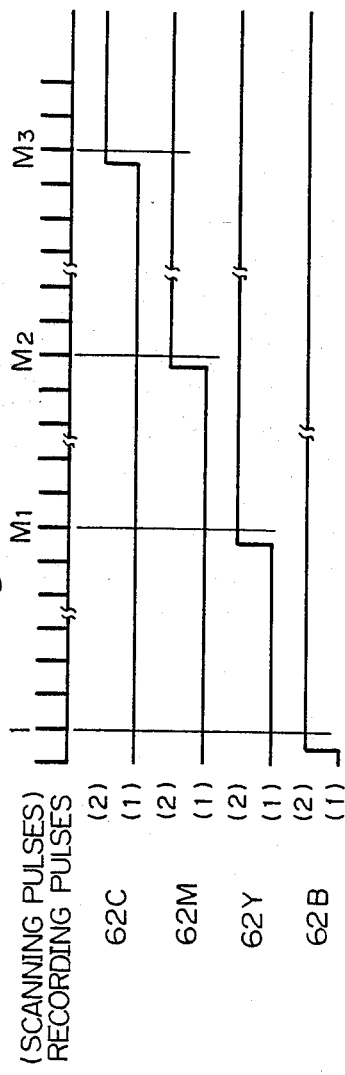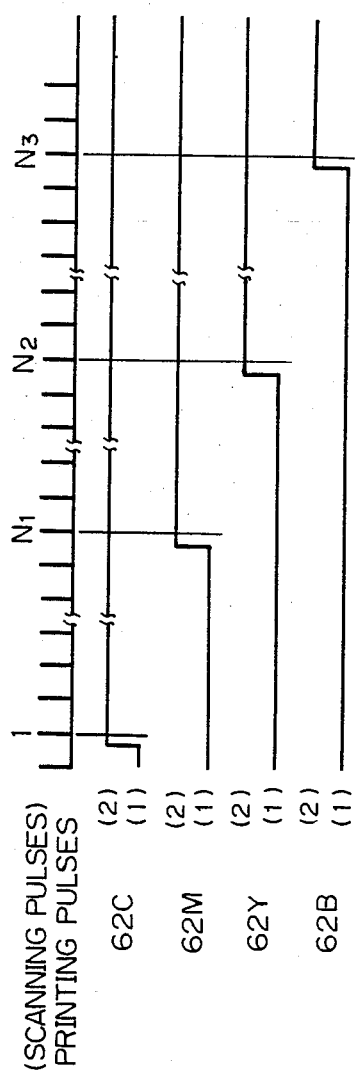

RECORDING APPARATUS

BACKGROUND OF THE INVENTION

1. Field of the Invention

The present invention relates to a recording apparatus for recording information on a special recording medium as well as normal recording paper.

2. Related Background Art

In ink-jet recording apparatuses or the like, an ink attached to a recording medium must be immediately absorbed therein. If a recording medium is paper, its ink-absorbing property is good. However, if the recording medium is a film sheet such as an OHP, an ink cannot be immediately absorbed therein because a coating layer is formed on the surface of the sheet.

In order to improve ink absorption, a film sheet is proposed in Japanese Patent Application Laid-open (Kokai) No. 136480/1983 wherein an ink receiving layer having a high ink absorbing capacity is formed on a transparent base film. The ink absorption speed of this film sheet is high, and at the same time, the recorded contents can be observed from the opposite major surface to which the ink is not attached. The recorded contents appear as if they are coated by the base film, thereby obtaining a high-quality, glossy image.

However, if this recording medium is used in a conventional recording apparatus, the observing surface is the rear surface, and the right and left sides are inverted, resulting in inconvenience.

The inverted image is recorded using software but control is complicated.

If this film sheet is used in the conventional recording apparatus, since the observing surface is the rear surface of the conventional recording medium, the right and left sides of the image are reversed. The overlapping order of the inks is also reversed, and a color value difference is large as compared with recording on normal recording paper.

SUMMARY OF THE INVENTION

It is an object of the present invention to provide a recording apparatus capable of recording information on the special recording medium described above as well as the normal recording medium.

It is another object of the present invention to simplify a control circuit of the recording apparatus.

It is still another object of the present invention to prevent color differences between recording on the special recording medium and recording on the normal recording medium.

The above and other objects, features, and advantages of the present invention will be apparent from the following detailed description taken in conjunction with the accompanying drawings.

BRIEF DESCRIPTION OF THE DRAWINGS

FIG. 3 is a block diagram of a control circuit of the recording apparatus shown in FIG. 1;

FIGS. 5, 6, 7A, 7B, 8 and 9 are respectively schematic views for explaining a discrimination method of the B.P.F. sheet;

FIGS. 11A and 11B are a flow chart for explaining the operation of the apparatus in FIG. 1;

FIG. 12 is a timing chart of the signals in a B.P.F. recording mode;

FIG. 13 is a timing chart of the signals in a normal paper recording mode; and

DETAILED DESCRIPTION OF THE PREFERRED EMBODIMENT

Figure 1:
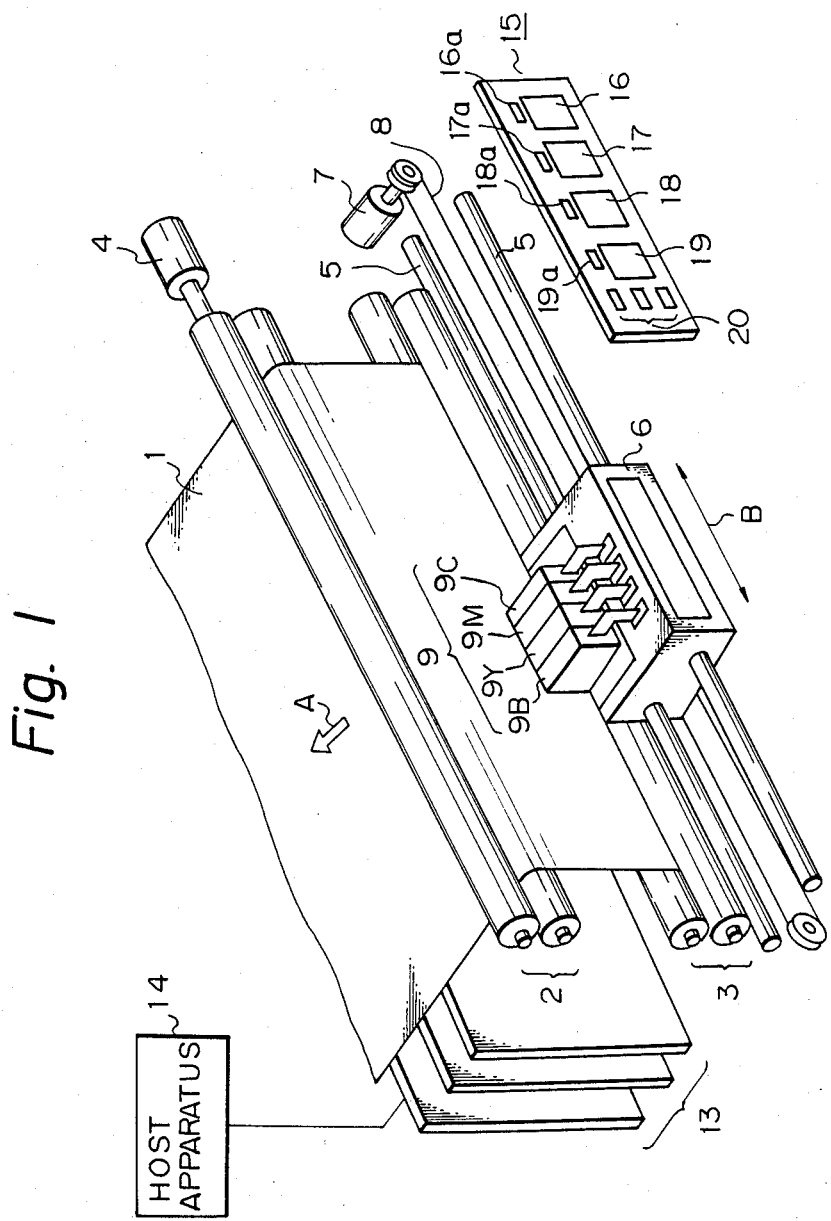
FIG. 1 is a schematic perspective view of a recording apparatus according to an embodiment of the present invention.

FIG. 1 shows an ink-jet type color recording apparatus according to an embodiment of the present invention.

Referring to FIG. 1, a recording medium 1 such as paper or a plastic sheet is supported by feed rollers 2 and 3 each consisting of a pair of rollers. The recording medium 1 is fed by the feed rollers 2 driven by a paper feed motor 4 in a direction indicated by arrow A.

Guide shafts 5 extend in front of and parallel to the feed rollers 2 and 3. A carriage 6 is driven along the guide shafts 5 by a carriage motor 7 via a wire 8. In this manner, the carriage 6 is moved relative to the recording medium.

A bubble-jet recording head 9 as the ink-jet head is mounted on the carriage 6. Black, yellow, magenta, and cyan nozzles 9B, 9Y, 9M and 9C are sequentially mounted on the head 9 to extend parallel to the guide shafts 5.

Figure 2:
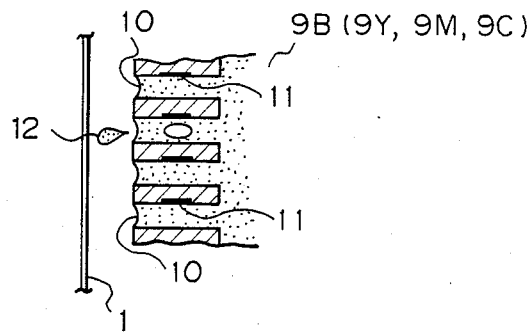
FIG. 2 is a sectional view showing a nozzle in the recording apparatus shown in FIG. 1.

A vertical array of a plurality of (e.g., 32) ink discharge ports 10 (FIG. 2) are formed on the front surface, of each of the nozzles 9B to 9C, which opposes the recording medium 1 at a predetermined interval (e.g., 0.8 mm). Electrical-heat converters 11 at the respective ink discharge ports are driven in accordance with printing data to form flying ink droplets 12, thereby recording printing dots on the recording medium 1 in a predetermined pattern.

A printed circuit board 13 in FIG. 1 has an electric circuit for driving the recording apparatus of this embodiment. A host apparatus 14 as an external apparatus is connected to the electric circuit, and data sent from the host apparatus is recorded.

An operation panel 15 is arranged on a housing (not shown) of the recording apparatus. The operation panel 15 includes an on-/off-line selection key 16, a line feed key 17, a form feed key 18, and a recording mode selection key 19. Indicator lamps 16a, 17a, 18a, and 19a are arranged in correspondence with the keys 16, 17, 18, and 19, respectively. Caution lamps 20 include an alarm lamp and a power lamp.

FIG. 3 is a block diagram of a control circuit in the recording apparatus. A CPU (microprocessor) 21 is connected to the host computer 14 through an interface 22. The CPU 21 controls recording operation on the basis of command and recording data signals read from the host computer 14 to a data memory 23 and programs stored in ROMs such as a program memory 24 and a working memory 25.

The CPU 21 controls the carriage motor 7 and the paper feed motor 4 through an output port 26 and a motor driver 27. At the same time, the CPU 21 controls the recording head 9 through a head drive circuit 29 in accordance with the contents stored in the data memory 23.

A paper sensor 30 detects whether a recording medium is present between the paper feed rollers 2 and 3 and sends a detection signal to the CPU 21 through an input interface 31. An input from each operation key on the operation panel 15 is transmitted to the CPU 21 through an input port 32. A DIP switch 33 is arranged on the bottom surface of the housing (not shown) of the recording apparatus (not shown). An output from the DIP switch 33 is transmitted to the CPU 21 through an input port 34.

A B.P.F. (Back-Print Film) discrimination sensor 35 discriminates whether a loaded recording medium is recorded from its lower surface and the printed contents are checked from the upper surface. The detailed arrangement of the B.P.F. discrimination sensor will be described later.

The lamps 16a, 17a, 18a, 19a, and 20 are driven by the CPU 21 through an output port 36 to indicate various states such as whether the on-line mode is set, whether the B.P.F. recording mode is set, and whether the paper is absent.

Figure 4:
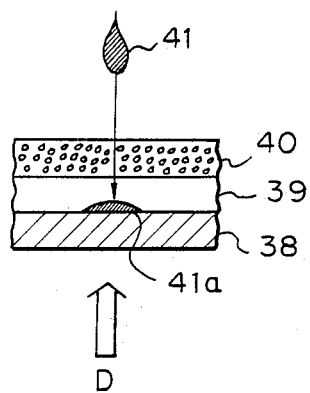
FIG. 4 is a sectional view of a B.P.F. (Back-Print Film) sheet.

FIG. 4 is a sectional view showing part of a B.P.F. sheet. The sheet has a transparent base layer 38 of a polyester-based resin or the like and an ink holding layer 39 of a water-soluble or hydrophilic polymer (e.g., albumin, gelatin, or casein) formed on the base layer 38. An ink transport layer 40 of a water-soluble or hydrophilic polymer containing a high content of a filler (e.g., silica, clay, or talc) is formed on the ink holding layer 39.

In the above B.P.F. sheet, an ink droplet 41 is attached to the lower surface, i.e., the ink transport layer 40. The ink droplet 41 passes through the ink transport layer 40 and held as an ink particle 41a at an interface between the ink holding layer 39 and the base layer 38. The recorded content can be observed from the upper surface, i.e., the base layer 38.

Figure 5:
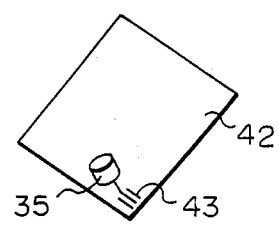

FIG. 5 shows a relationship between the B.P.F. sheet 42 and the identification sensor 35 for discriminating the sheet 42. A bar code 43 is printed at the end portion of the B.P.F. sheet. When the sheet is loaded between the feed rollers 2 and 3 shown in FIG. 1, the discrimination sensor 35 comprising an optical sensor located at a position corresponding to that of the bar code 43 reads the bar code 43 and discriminates that the loaded medium is a B.P.F. sheet according to the read bar code. Since a normal sheet does not have a bar code, a B.P.F. sheet can be accurately discriminated from a normal sheet.

Other methods of discriminating a B.P.F. sheet according to the present invention will be described with reference to FIGS. 6 to 9.

FIG. 6 shows a case wherein a magnetic material 44 is applied to the surface of a B.P.F. sheet 42 and is detected by a magnetic sensor 45 such as a Hall element.

FIGS. 7A and 7B show a case wherein oblique or rectangular notches 42a and 42b are formed at the leading end of a B.P.F. sheet 42, and optical sensors 35a and 35b are arranged at positions corresponding to the notches 42a and 42b. When the B.P.F. sheet 42 is moved in a direction indicated by arrow 47, a time lag occurs between the detection signals from the optical sensors 35a and 35b. The B.P.F. sheet 42 is discriminated by this time lag.

Figure 8:
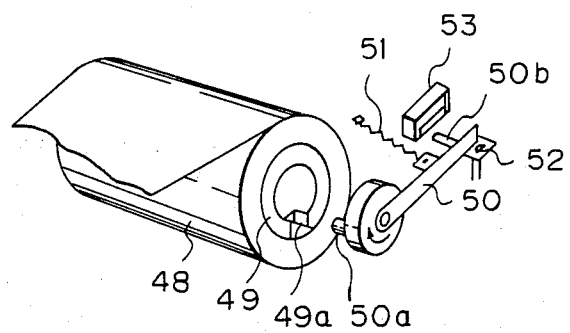

FIG. 8 shows a case wherein a notch 49a is formed in a core member 49 of a B.P.F. roll 48 and a detection lever 50 is arranged at a position corresponding to that of the notch 49a. The detection lever 50 is pivotal about a shaft 52. The detection lever 50 is biased by a spring 51 so that a distal end member 50a thereof abuts against the core member 49. The distal end member 50a is designed to be pivoted. When the recording medium roll is set in a printer apparatus and is a B.P.F. roll, the distal end 50a is fitted in the notch 49a. A projection 50b of the lever 50 presses a switch 53, and then the switch 53 generates a discrimination signal. The notch 49a may be replaced with a projection.

Figure 9:
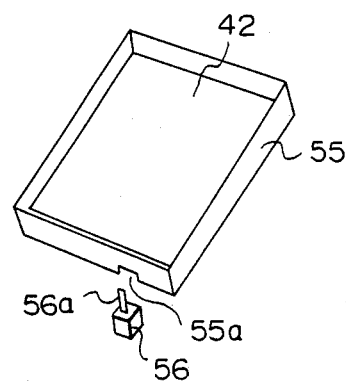

FIG. 9 shows a case wherein a recess 55a is formed at the leading end portion of a cartridge 55 for storing a plurality of B.P.F. sheets 42, and a microswitch 56 is formed in a printer to detect the presence/absence of the recess 55a. When the cartridge 55 is attached to the recording apparatus, an actuator 56a of the switch 56 is inserted into the recess 55a to generate a discrimination signal. The recess 55a may be replaced with a projection to obtain the same effect as described above.

Figure 10:
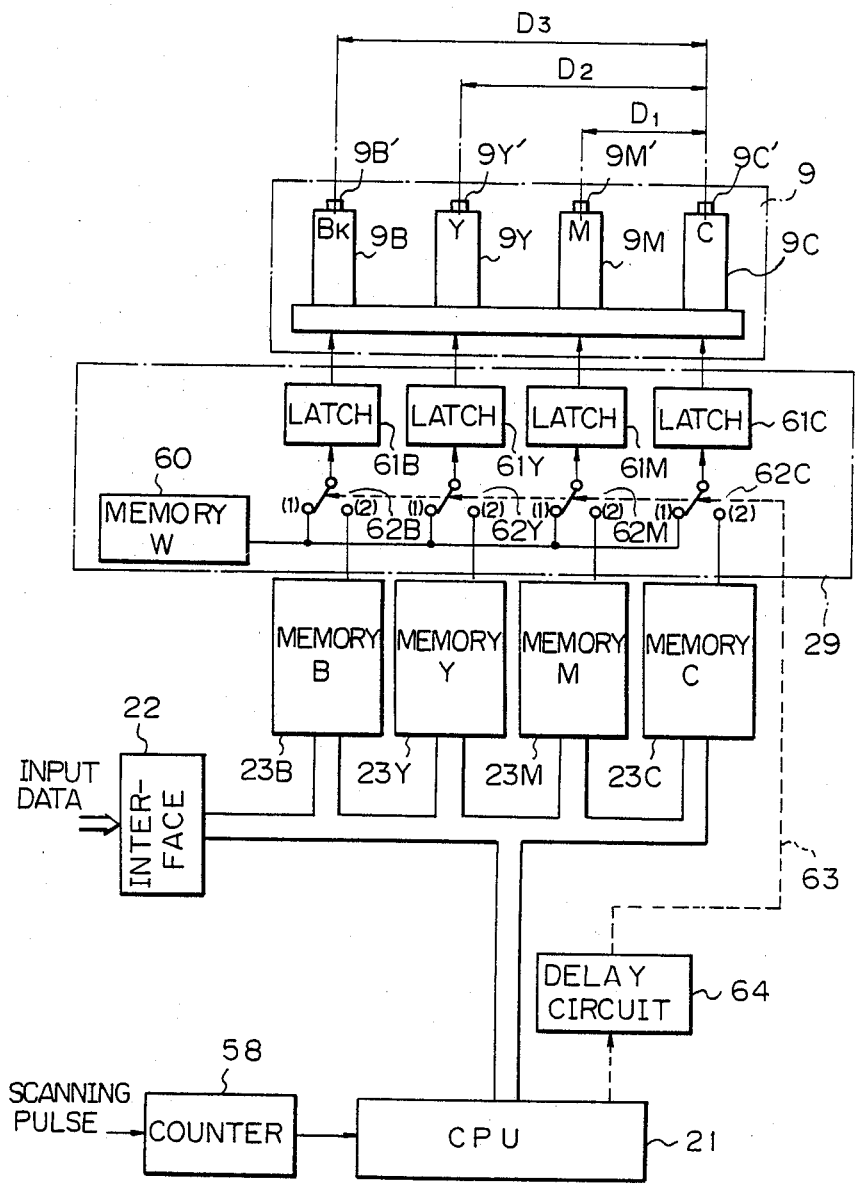
FIG. 10 is a block diagram of a head control system in the apparatus of FIG. 1.

FIG. 10 is a block diagram of a recording head control system in the recording apparatus shown in FIG. 1.

Referring to FIG. 10, a plurality of nozzles 9C, 9M, 9Y, and 9B (ink discharge ports 9C', 9M', 9Y', and 9B') are spaced apart by distances D1, D2, and D3 with respect to the nozzle 9C as a reference along the scanning direction (a direction indicated by arrow B in FIG. 1).

A scanning distance of the carriage 6 is detected by counting the number of pulses of the drive motor. A signal from a counter 58 is input to the CPU 21.

Recording data of the respective colors are input to data memories 23B, 23Y, 23M, and 23C through the interface 22.

A blank data (e.g., white data) memory 60 is arranged in parallel with the data memories 23B, 23Y, 23M, and 23C. The memory 60 and latches 61B, 61Y, 61M, and 61C are connected to be switched by switches 62B, 62Y, 62M, and 62C. The latches 61B, 61Y, 61M and 61C latch one-cycle signals of the respective nozzles 9B to 9C. A recording command (ink discharge command) signal line 63 is connected from the CPU 21 to the switches 62B, 62Y, 62M, and 62C. Control is switched from the blank memory 60 to the memories 23B, 23Y, 23M, and 23C, thereby discharging the corresponding inks.

The CPU 21 causes a delay circuit 64 to delay ink discharge command timings on the basis of the distances D1 to D3 with respect to the nozzle 9C as a reference so as to match the scanning position of the carriage 6 with each recording nozzle position, thereby achieving accurate registration.

The operation of the embodiment described above will be described with reference to a flow chart of FIG. 11.

In step S1, the recording data of one scanning (128 rasters) is fetched from the host computer to the data memories 23B, 23Y, 23M, and 23C through the interface 22. The CPU 21 determines in step S2 whether the B.P.F. sheet recording mode is set. If YES in step S2, the flow advances to step S3. Otherwise, the flow advances to step S4.

Whether the B.P.F. sheet recording mode is set or not is determined by the CPU 21 on the basis of the output from the discrimination sensor 35. In this case, the mode can be manually selected by the recording mode selection key 19 on the operation panel.

If the CPU 21 determines that the B.P.F. recording mode is set, the carriage 6 is moved to the right side end (FIG. 1) in step S3. In step S5, the CPU 21 operates the switches in the order of 62B, 62Y, 62M, and 62C with delays. In steps S6 and S7, the CPU 21 transfers and records recording data in the same order as stored in step S1. FIG. 12 shows the relationship between the scanning pulses and the switching timings of the switches 62B, 62Y, 62M, and 62C in the B.P.F. recording mode. The switch 62B is switched from the blank data memory 60 to the data memory 23B, and recording is initiated. When the carriage 6 is moved by the distance M1, the switch 62Y is switched. Finally, the switch 62C is switched in the same manner as described above. In the timing chart of FIG. 12, 1, M1, M2, and M3 represent recording start timings of the cyan, magenta, yellow, and black nozzles, respectively.

The ink droplets are sequentially attached to the B.P.F. sheet as described above. More specifically, the ink droplets are attached at a single point in an order of B (black), Y (yellow), M (magenta), and C (cyan).

The CPU 21 determines in step S8 whether one scanning is completed. If NO in step S8, the flow returns to step S5. However, if YES in step S8, the flow advances to step S9 wherein the carriage 6 is moved from the right to left by one step (1/400 inch). The CPU 21 then determines in step S10 whether an end of one page is detected. If NO in step S10, the flow returns to step S1. If YES in step S10, the sequence is ended.

If the flow advances from step S2 to step S4, the CPU 21 determines that the normal sheet recording mode is set. In this case, the carriage 6 is moved to the left side end (FIG. 1).

In step S11, the CPU 21 operates the switches in an order of 62C, 62M, 62Y, and 62B with delays. In steps S12 and S13, an erected image is recorded. The CPU 21 then determines in step S14 whether one scanning is completed. If YES in step S14, the paper is advanced by one line. Recording continues until the end of one page is detected.

FIG. 13 is a timing chart showing a relationship between the scanning pulses and the switching timings of the switches 62B, 62Y, 62M, and 62C in the erected image recording mode. In this mode, the switches are operated in an order of 62C, 62M, 62Y, and 62B with delays corresponding to the distances M1, M2, and M3. When the ink droplets are attached to a single position on the normal sheet, the inks are stacked in an order of C (cyan), M (magenta), Y (yellow), and B (black). In this case, 1, M1, M2, M3 represent the recording start timings of the cyan, magenta, yellow, and black nozzles.

When a magenta dot is stacked on a cyan dot, a blue dot is formed. Similarly, when a yellow dot is stacked on a cyan dot, a green dot is formed. When a yellow dot is stacked on a magenta dot, a red dot is formed. Therefore, seven colors of black, yellow, magenta, cyan, blue, green, and red are the basic colors for a color image recorded by the ink-jet scheme. The colors (e.g., blue, green, and red) obtained by mixing pairs of colors can be reproduced, but high-quality color tones cannot be strictly reproduced.

Figure 14A:
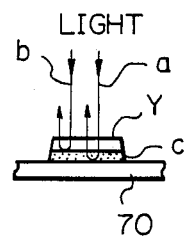
FIGS. 14A and 14B are views for explaining different colors observed by the operator.
Figure 14B:
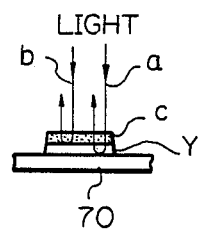

This phenomenon will be described with reference to FIGS. 14A and 14B. FIG. 14A shows a case wherein an yellow (Y) ink droplet is stacked on a cyan (C) ink droplet on a sheet 70. FIG. 14B shows a case wherein a cyan (C) ink is stacked on a yellow (Y) ink droplet on the sheet 70. Referring to FIG. 14A, incident light a passes through the yellow (Y) and cyan (C) layers, is reflected by the sheet 70, and is incident on an eye through the cyan (C) and yellow (Y) layers. Incident light b passes through the yellow (Y) layer, is reflected by the cyan (C) layer, and is incident on an eye through the yellow layer (Y). Human eye senses the light a and the light b as single green light. Since the reflecting layer of light b in FIG. 14B is the yellow (Y) layer, its color value is different from that in FIG. 14A.

In order to solve the above problem in the recording apparatus, the registration or stacking order of the inks is reversed in the normal sheet and B.P.F. recording modes. An image obtained by the stacking order of the ink droplets in the B.P.F. recording mode can be observed as the same image obtained by the stacking order of the ink droplets in the normal sheet recording mode, thereby obtaining identical color tones in both the B.P.F. and normal paper recording modes.

The present invention is not limited to the particular embodiments described above, i.e., to the ink-jet recording apparatuses. The present invention is also applicable to a thermal transfer recording apparatus.

In the above embodiment, a serial head is used. However, a full-line head may be used. In this case, the full line heads are arranged in units of colors and are sequentially aligned in a feed direction of the recording medium. By using these heads, reversal recording as in the above embodiment can be performed.

Even if a serial head is used, the same recording as described above may be performed by moving a recording medium.

We claim:

1. A recording apparatus including:
   means for storing image information to be recorded;
   means for recording on a recording medium having first and second surfaces, an image stored in said storing means; and
   drive control means having a first mode for controlling said recording means so that the image information in said storing means is recorded as an erected image of the stored image information when viewed from the side of the recording medium first surface, and a second mode for controlling said recording means so that the image information in said storing means is recorded as an erected image of the stored image information when viewed from the side of the recording medium second surface.

2. An apparatus according to claim 1, wherein said recording means includes an ink-jet recording head for recording the recording information by injecting an ink droplet onto the recording medium.

3. An apparatus according to claim 2, wherein the recording medium comprises a special recording medium in which the ink droplet is injected onto the first surface and the erected image is observed from the second surface.

4. An apparatus according to claim 3, further including means for detecting whether the recording medium is the special recording medium of a normal recording medium, and wherein said drive control means performs recording in the first or second mode on the basis of a detection result from said detecting means.

5. A recording apparatus including:
   means for storing image information to be recorded;
   recording means, reciprocally and relatively movable between first and second ends of a recording medium, for recording the image information stored in said storing means, the recording medium having first and second surfaces; and drive control means haivng a first mode for controlling said recording means so that the image information in said storing means is recorded as an erected image of the stored image information when viewed from the side of the recording medium first surface, and a second mode for controlling said recording means so that the image information in said storing means is recorded as an erected image of the stored image information when viewed from the side of the recording medium second surface, whereby the erected image is recorded in the first mode when said recording means is moved from the first end to the second end, and a reverse image of the erected image is recorded in the second mode when said recording means is moved from the second end to the first end.

6. An apparatus according to claim 5, wherein said drive control means reads out the image information from said storing means in identical sequences in both the first and second modes.

7. An apparatus according to claim 5, wherein said recording means includes an ink-jet recording head for recording the image information by discharging an ink droplet onto the recording medium.

8. An apparatus according to claim 7, wherein the recording medium comprises a special recording medium in which the ink droplet is injected on to the first surface and the erected image is observed from the second surface in the second mode.

9. An apparatus according to claim 7, wherein said recording head comprises a plurality of ink discharge portions for discharging inks having different colors in a feed direction thereof.

10. An apparatus according to claim 9, wherein said drive control means includes delay means for reversing a discharge order of said plurality of discharge portions in said recording head in the first and second modes.

11. A recording apparatus including:
storing means for storing image information to be recorded, and color information:
recording means for recording the image information stored in said storing means on a recording medium in a plurality of colors according to the color information, the recording medium having first and second surfaces; and
drive control means having a first mode for controlling said recording means so that the image information in said storing means is recorded as an erected image of the stored image information when viewed from the side of the recording medium first surface, and a second mode for controlling said recording means is recorded as an erected image of the stored image information when viewed from the side of the recording medium second surface, said drive control means being arranged to drive said recording means to perform recording in accordance with a first color stacking order in the first mode and a second color stacking order in the second mode.

12. An apparatus according to claim 11, wherein said recording means includes an ink-jet recording head having a plurality of ink discharge portions for discharging inks having different colors.

13. An apparatus according to claim 12, further comprising means for moving said recording head along the recording medium, said recording head being provided with said plurality of ink discharge portions aligned along a feed direction thereof.

14. An apparatus according to claim 13, wherein said drive control means causes said plurality of ink discharge portions to discharge the inks having the different colors according to the first ink stacking order while said recording head is moved from one end to the other end in the first mode, and causes said plurality of ink discharge portions to discharge the inks having the different colors according to the second ink stacking order while the recording head is moved from said other end to said one end in the second mode.

15. An apparatus according to claim 14, wherein the first ink stacking order is opposite the second ink stacking order.

16. An apparatus according to claim 11, wherein the recording medium comprises a special recording medium in which the ink droplet is injected on the first surface and the erected image is observed from second surface.

17. An apparatus according to claim 16, further including means for detecting whether the recording medium is the special recording medium or a normal recording medium, and wherein said drive control means performs recording in the first or second mode on the basis of a detection result from said detecting means.

* * * * *

UNITED STATES PATENT AND TRADEMARK OFFICE
CERTIFICATE OF CORRECTION

PATENT NO.   : 4,788,563
DATED        : November 29, 1988
INVENTOR(S)  : SHINICHI OMO, ET AL.

It is certified that error appears in the above-identified patent and that said Letters Patent is hereby corrected as shown below:

COLUMN 3

Line 36, "and" should read --and is--.

COLUMN 5

Line 44, "$M_1$, $M_2$, $M_3$" should read --$N_1$, $N_2$, $N_3$--.

Line 48, "$M_1$, $M_2$, $M_3$" should read --$N_1$, $N_2$, $N_3$--.

COLUMN 7

Line 41, "information:" should read --information;--.

COLUMN 8

Line 5, "means is" should read --means so that the image information in said storing means is--.

Signed and Sealed this

Fifth Day of September, 1989

Attest:

DONALD J. QUIGG

Attesting Officer

Commissioner of Patents and Trademarks